(12) United States Patent
Viegener

(10) Patent No.: US 7,316,429 B2
(45) Date of Patent: Jan. 8, 2008

(54) PRESSED-CONNECTION ARRANGEMENT

(75) Inventor: Walter Viegener, Attendorn (DE)

(73) Assignee: Viega GmbH & Co., KG, Attendorn (DE)

( * ) Notice: Subject to any disclaimer, the term of this patent is extended or adjusted under 35 U.S.C. 154(b) by 199 days.

(21) Appl. No.: 11/122,050

(22) Filed: May 5, 2005

(65) Prior Publication Data

US 2005/0248152 A1 Nov. 10, 2005

(30) Foreign Application Priority Data

May 7, 2004 (DE) .................. 20 2004 007 291 U

(51) Int. Cl.
*F16L 19/06* (2006.01)
*F16L 19/08* (2006.01)

(52) U.S. Cl. ...................... 285/340; 285/307

(58) Field of Classification Search ............... 285/256, 285/307, 321, 340, 374
See application file for complete search history.

(56) References Cited

U.S. PATENT DOCUMENTS

| | | | |
|---|---|---|---|
| 2,225,208 A | 12/1940 | Crickmer | |
| 3,057,630 A | 10/1962 | Sneed | |
| 3,323,806 A | 6/1967 | Smith et al. | |
| 3,365,219 A * | 1/1968 | Nicolaus | 285/340 |
| 3,601,419 A | 8/1971 | Fern | |
| 3,663,024 A | 5/1972 | Traub | |
| 3,889,958 A | 6/1975 | Bennett | |
| 4,018,462 A | 4/1977 | Saka | |
| 4,146,254 A * | 3/1979 | Turner et al. | 285/105 |
| 4,449,718 A | 5/1984 | Müller | |
| 4,729,569 A | 3/1988 | Muller et al. | |
| 4,880,260 A | 11/1989 | Gotoh et al. | |
| 4,917,390 A | 4/1990 | Lee et al. | |
| 4,936,197 A | 6/1990 | Brent | |
| 4,964,657 A * | 10/1990 | Gonzales | 285/8 |
| 5,101,757 A | 4/1992 | Schumacher | |
| 5,108,134 A | 4/1992 | Irwin | |
| 5,111,736 A | 5/1992 | Buchberger et al. | |
| 5,433,452 A | 7/1995 | Edlund et al. | |
| 5,695,224 A * | 12/1997 | Grenier | 285/104 |

(Continued)

FOREIGN PATENT DOCUMENTS

CA 2325451 2/1999

(Continued)

OTHER PUBLICATIONS

Patent Abstract of Japan, Tomokimi, "Rotary Shaft Seal Device for High Pressure Fluid", Pub. No. 03249481, Pub. Date Jul. 11, 1991.

(Continued)

*Primary Examiner*—Aaron Dunwoody
*Assistant Examiner*—Fannie C. Kee
(74) *Attorney, Agent, or Firm*—Barnes & Thornburg LLP

(57) ABSTRACT

A pressed connection arrangement including a first pipe end and a connection piece configured to receive the pipe end. The connection piece has a ring-shaped receiving device and the ring-shaped receiving device includes a cutting ring and a sealing ring. A separating ring is located between the sealing ring and the cutting ring such that the separating ring holds the cutting ring at a distance from the sealing ring.

9 Claims, 3 Drawing Sheets

U.S. PATENT DOCUMENTS

| | | |
|---|---|---|
| 5,722,702 A | 3/1998 | Washburn |
| 5,755,446 A | 5/1998 | Dean et al. |
| 6,224,114 B1 | 5/2001 | Franzen et al. |
| 6,427,309 B1 | 8/2002 | Viegener |
| 6,805,385 B2 | 10/2004 | Viegener |
| 2003/0038481 A1 | 2/2003 | Viegener |

FOREIGN PATENT DOCUMENTS

| | | |
|---|---|---|
| DE | 32 25 906 A1 | 1/1984 |
| DE | 0 418 732 A1 | 3/1991 |
| DE | 41 0 6459 A1 | 8/1991 |
| DE | 196 31 574 C1 | 11/1997 |
| DE | 297 21 760 U1 | 3/1998 |
| DE | 198 13 805 C1 | 7/1999 |
| DE | 100 54 367 A1 | 5/2002 |
| DE | 101 25 302 C1 | 6/2002 |
| DE | 699 07 592 T2 | 5/2003 |
| DE | 102 07 201 A1 | 9/2003 |
| EP | 0 670 444 A1 | 9/1995 |
| EP | 1 081 423 A1 | 3/2001 |
| EP | 0 989 348 B1 | 5/2003 |
| GB | 2 115 518 A | 9/1983 |
| WO | WO 97/31215 A1 | 8/1997 |
| WO | WO 00/60267 A1 | 10/2000 |
| WO | WO 02/08614 A2 | 1/2002 |

OTHER PUBLICATIONS

Patent Abstract of Japan, Kazumi et al., "Connecting Method of Pipe", Pub. No. 56009026, Pub. Date Jan. 29, 1981.

Patent Abstract of Japan, Kazumi et al, "Connecting Method of Pipe", Pub. No. 56009025, Pub. Date Jan. 29, 1981.

* cited by examiner

A)

B)

C)

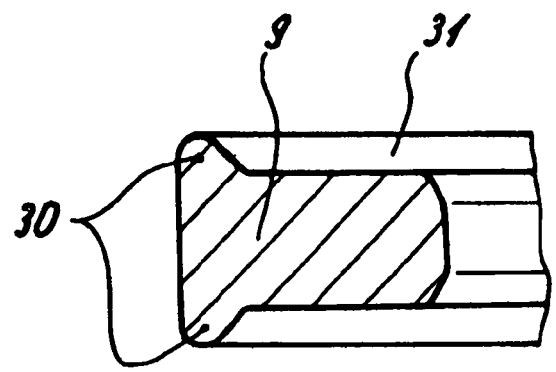
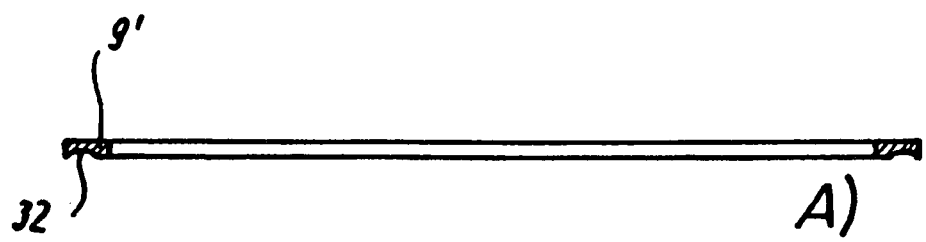
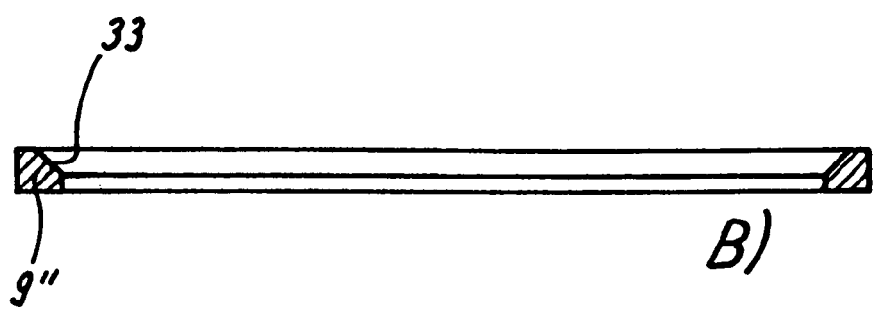
Fig. 4
Fig. 5

PRESSED-CONNECTION ARRANGEMENT

This application claims benefit of German Application 20 2004 007 291.2 filed May 7, 2004, which disclosure is hereby incorporated by reference herein.

BACKGROUND AND SUMMARY

The present disclosure relates to a pressed-connection arrangement having a connection piece. The connection piece may be made of a cold-workable material, which is constructed on a fitting or a valve and into which a pipe end can be pushed. The connection piece has a ring-shaped receiving device in which a metallic cutting ring and a sealing ring are held.

From German Patent Document DE 297 21 760, a pressed connection between a fitting and a metal pipe end is known. A receiving device for a sealing ring and a spaced receiving device for a cutting ring is provided on the fitting. A pipe end is pushed into the connection piece, and a radial pressing-together is then carried out in order to establish a sealed-off connection, the cutting ring providing a mechanical fixing of the pipe end. The providing of a receiving device for the sealing ring and of a receiving device for the cutting ring requires comparatively high expenditures. It is difficult to produce the connection piece by a forming method because, when the second receiving device is produced, there is the risk that the already produced first receiving device will be deformed again. In practice, corresponding connection pieces are therefore cast and subsequently finished.

From U.S. Patent Document U.S. Pat. No. 5,108,134, another pressed connection is known, in which a cutting ring and a sealing ring are arranged adjacent to one another on a connection piece. There is the risk that, during the pressing-together of the connection, the sealing ring may be damaged and its tightness can therefore not be guaranteed. In addition, the cutting ring is situated on the side facing the pipe end in the hydraulically guided area, so that a contamination of the piping system by the cutting ring cannot be excluded.

The present disclosure is related to a pressed-connection arrangement which ensures a durable sealing-off while its construction is simple.

The present disclosure includes a pressed connection arrangement including a pipe end, and a connection piece configured to receive the pipe end. The connection piece includes a ring-shaped receiving device including a cutting ring and a sealing ring.

Further, according to the present disclosure, a separating ring is provided between the sealing ring and the cutting ring, by which separating ring the cutting ring is held at a distance from the sealing ring. As a result, only a single ring-shaped receiving device has to be shaped out at the connection piece, in which receiving device the sealing ring, the separating ring and the cutting ring will then be held. The arrangement of a separating ring between the sealing ring and the cutting ring represents a simplification in comparison to the separate construction of receiving devices. By the separating ring, it is ensured that, during the pressing-together, the sealing ring is not damaged by the cutting ring, and a durable sealing-off can therefore be ensured.

According to an embodiment of the present disclosure; the sealing ring, the separating ring and the cutting ring are held in a prefixed manner as a preassembled unit in the essentially U-shaped receiving device before a pressing-together. In addition, the receiving device may have two inward-extending legs and the preassembled unit is thus held in a secured manner in the axial direction and cannot be lost during transport. Furthermore, the arrangement of the individual components cannot accidentally be confused.

The connection piece may be made of metal and produced by forming. A corresponding fitting can thereby be produced from a pipe section, in which case the receiving device can be produced by widening the pipe section. As a result, large diameters of over, for example, 50 mm can also be produced at reasonable cost. For the forming, presses and other tools known per se can be used. This simplifies the production of the connection piece which then no longer has to be produced from cast material with a subsequent surface finishing.

According to another embodiment of the present disclosure, the cutting ring has several cutting teeth which are arranged on a side facing the pipe end and, during the pressing-together, dig into the material of the pipe end. The cutting ring thereby offers a protection against a pulling-out of the pipe, in that the cutting teeth arranged in an inclined manner with respect to a radial direction can provide a particularly good securing of the pressed-connection arrangement. In this case, the cutting ring can be supported on the opposite side of the cutting teeth on a side wall of the receiving device, so that a pulling movement of the pipe can be diminished or absorbed by the connection piece.

The sealing ring can be held in the receiving device on a side facing the pipe end. As a result, the separating ring and the cutting ring are arranged on a side of the receiving device facing away from liquid, and the pipe end or piping system cannot be contaminated.

On its exterior side facing away from the pipe end, the separating ring has a rounded edge projecting to the sealing ring. The separating ring therefore has a set-back receiving device below the rounded edge, in which receiving device the sealing ring can be inserted during the pressing-together. The reason is that, as a result of compression of the sealing ring in the radial direction, its axial dimension becomes larger and the separating ring offers a space to the sealing ring, into which the latter can be pressed. In this case, the separating ring may also form-lockingly rest against the sealing ring and the cutting ring in the axial direction.

For an easy mounting, the separating ring is constructed to be closed in a surrounding manner and includes an elastic material, such as a plastic material, and can be inserted into the receiving device of the connection piece by a slight elastic deformation.

Other aspects of the present disclosure will become apparent from the following descriptions when considered in conjunction with the accompanying drawings.

BRIEF DESCRIPTION THE DRAWINGS

FIG. 4 is a sectional view of the separating ring of the pressed-connection arrangement of FIG. 1.

FIG. 5A is a sectional view of an embodiment of a separating ring, according to the present disclosure.

FIG. 5B is a sectional view of an embodiment of separation ring, according to the present disclosure.

DETAILED DESCRIPTION

Figure 1:
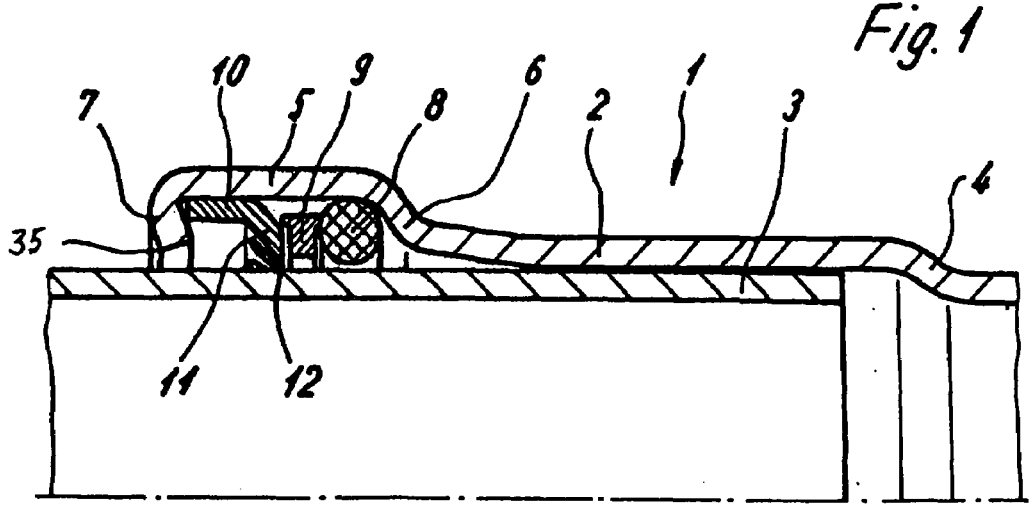
FIG. 1 is a sectional lateral view of an embodiment of a pressed-connection arrangement, according to the present disclosure.

As shown in FIG. 1, a pressed-connection arrangement 1 comprises a fitting or connection piece 2 which may be made of a metal, such as copper, steel or another metal alloy. A first pipe end 3, which may also be made of metal, is inserted into the connection piece 2. It is conceivable that the pipe end 3 may be made of a composite material which is then reinforced, for example, by a supporting sleeve (not shown). The pipe end 3 can be pushed into the connection piece 2 up to a stop 4 which is formed by a slight radial tapering of the connection piece 2.

A receiving device 5 is constructed on an end side of the connection piece 2, which receiving device 5 has a diameter which is enlarged in comparison to a remaining portion of connection piece 2. The receiving device 5 has an essentially U-shaped cross-section as well as an end-side leg 7 and a leg 6 facing the remaining portion of connection piece 2.

A prefixed or preassembled unit including a sealing ring 8, a separating ring 9 and a cutting ring 10 is arranged in the receiving device 5. These rings 8, 9, 10 are secured in an axial direction by the legs 6 and 7 and cannot accidentally fall out of the connection piece 2.

The cutting ring 10 has diagonally inward-projecting cutting teeth 11 which engage, by a pointed edge, as suggested at reference number 12, in the material of the pipe end 3. The separating ring 9 may be made of a plastic material and is constructed to be closed in a surrounding manner and is spaced away from the cutting ring 10. The separating ring 9 may be made of metal, such as steel, and the sealing ring 8 may be made of rubber. The separating ring 9 has a smaller radial dimension than a gap between the pipe end 3 and a wall of the receiving device 5, so that, during a pressing-together, the separating ring 9 is deformed only slightly.

During the pressing-together, the receiving device 5 is pressed in a radial direction onto the pipe end 3, the cutting teeth 11 digging into the material of the pipe end 3. Furthermore, the sealing ring 8 is pressed against the pipe end 3 for a durable sealing. In this case, the sealing ring 8 is pressed in a form-locking manner against the separating ring 9. In addition, the leg 7 of the receiving device 5 is pressed against the pipe end 3. In this case, the leg 7 is inclined slightly inward, and a surrounding edge 35 faces the pipe end 3 which, after the pressing-together, can also rest on the pipe end 3. The cutting ring 10 is supported in the axial direction at least on the leg 7.

Figure 2:
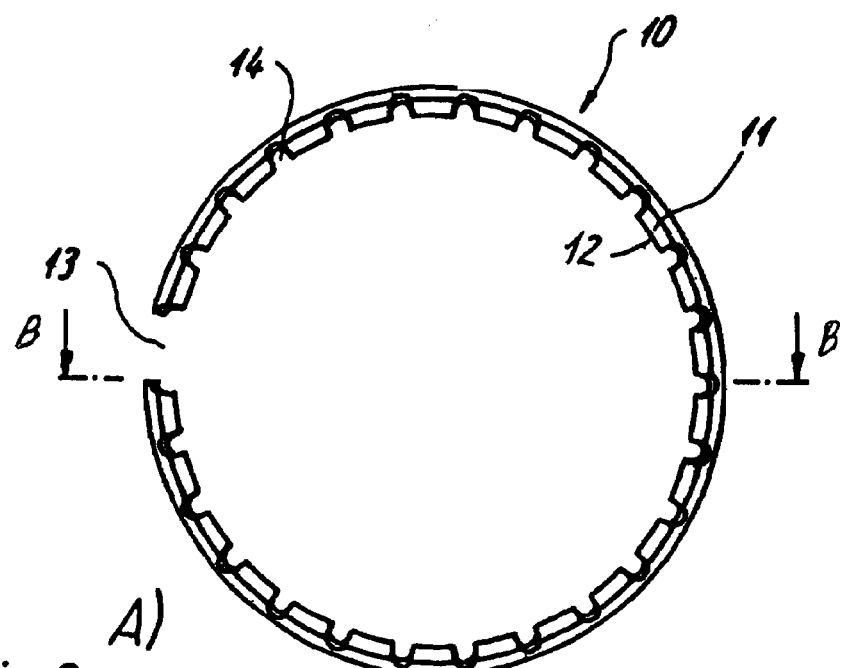
FIG. 2A is a plan view of the cutting ring of the pressed-connection arrangement of FIG. 1.
FIG. 2B is a cut-a-way view taken along line B-B of FIG. 2A.
Figure 2:
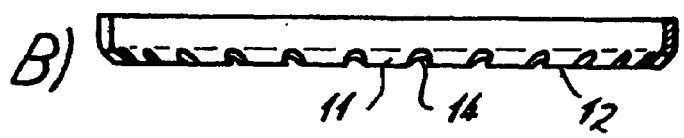

FIGS. 2A and 2B show the cutting ring 10 having a plurality of cutting teeth 11 distributed over a circumference, between which cutting teeth 11 gaps 14 are provided. The cutting ring 10 has a ring-shaped construction but has an interruption shown as an opening section 13. The cutting ring 10, which may be made of metal, can be pressed together in order to insert it into the receiving device 5.

Figure 3:
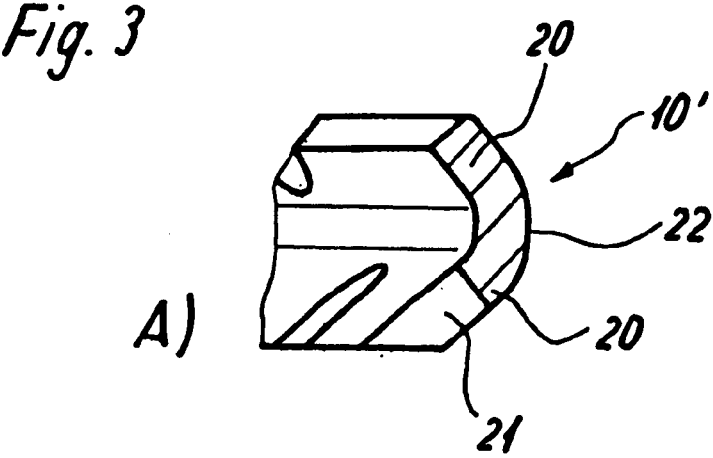
FIG. 3A is a sectional view of an embodiment of a cutting ring, according to the present disclosure.
FIG. 3B is a sectional view of an embodiment of a cutting ring, according to the present disclosure.
FIG. 3C is a sectional view of an embodiment of a cutting ring, according to the present disclosure.
Figure 3:
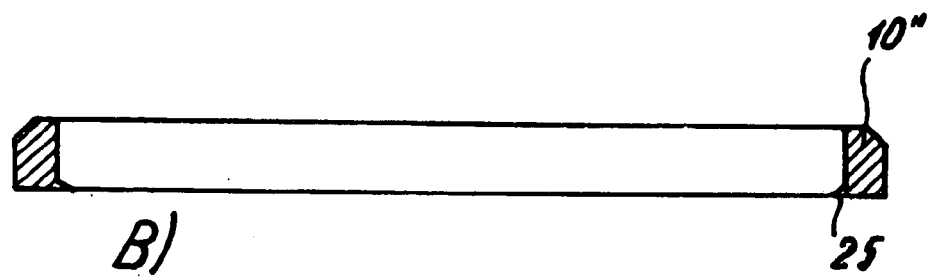
Figure 3:
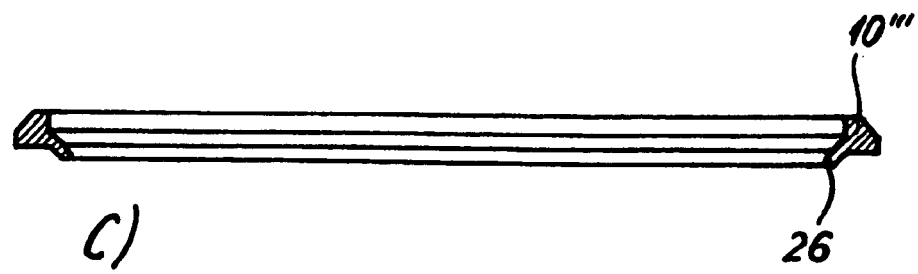

FIG. 3A is a cross-sectional view of an embodiment showing a modified cutting ring 10'. The cutting ring 10' has two radially inward-projecting legs 20 on which cutting teeth 21 are formed so that, during a pressing-together on a rear side 22 in a radial direction, the cutting teeth 21 on both legs 20 dig into the material of the pipe end 3.

In the case of the embodiment illustrated in FIG. 3B, a cutting ring 10" is provided. Cutting teeth 25 are formed which project in a radial direction and, when viewed in an axial direction, are arranged eccentrically.

In the embodiment of a cutting ring 10''', illustrated in FIG. 3C, cutting teeth 26 are provided which project diagonally to an inside and which are constructed to be inclined by approximately 40 to 50° with respect to a radial direction. During a pressing-together of the cutting ring 10''', the pipe end 3 is secured in the axial direction.

FIG. 4 is an enlarged sectional view of the separating ring 9. The separating ring 9 has an essentially T-shaped construction. On an outer circumference, separating ring 9 has rounded edges 30 projecting in an axial direction, so that, on a radial interior side of the edges 30, a receiving device 31 is formed. The separating ring 9 may be made of an elastic plastic material, such as POM, or another suitable material.

FIG. 5A illustrates an alternative embodiment, shown as a separating ring 9'. On one side, the separating ring 9' has a receiving device 32, in which the sealing ring 9' can be form-lockingly placed in a not pressed-together condition. Otherwise, the separating ring 9' is essentially constructed in a disk shape and requires a minimal amount of space.

The separating ring 9" illustrated in FIG. 5B has an essentially triangular shape and a sloped edge 33. A sealing ring 10 may be provided on this edge 33, which sealing ring 10 can be pressed into a cavity formed between the edge 33 and the pipe end 3 during a pressing-together.

For establishing the pressed-connection arrangement 1, the connection piece 2 is first produced by forming. For example, by pressing and pressing devices, an elevation is produced at which a leg 7 is bent away for producing the receiving device 5. Subsequently, the unit, including the sealing ring 8, the separating ring 9 and the cutting ring 10, is mounted into the receiving device 5. At a construction site, a pipe end 3 is then pushed into the connection piece 2 and the receiving device 5 is pressed together in the radial direction.

It is within the scope of the present disclosure that the geometry of the cutting ring 10 and of the separating ring 9 may vary from that disclosed herein. In addition, other types of materials may be used to construct the rings 8, 9 and 10.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A pressed connection arrangement comprising:
  a first pipe end;
  a connection piece configured to receive the first pipe end and having a ring-shaped receiving device, the ring-shaped receiving device including a cutting ring and a sealing ring; and
  a separating ring located between the sealing ring and the cutting ring such that the separating ring holds the cutting ring at a distance from the sealing ring, the separating ring being T-shaped and having rounded edges projecting axially such that on a radial interior side of the rounded edges a receiving device is formed, the receiving device providing a space, and into which space the sealing ring is pressed as a result of a compression of the sealing ring in the radial direction.

2. The pressed-connection arrangement according to claim 1, wherein the sealing ring, the separating ring and the cutting ring are a preassembled unit, and are held in a prefixed manner in the receiving device before a pressing-together.

3. The pressed-connection arrangement according to claim 1, wherein the connection piece is made of metal and is produced by forming.

4. The pressed-connection arrangement according to claim 1, wherein the cutting ring includes a plurality of cutting teeth, which cutting teeth are arranged on a side facing the first pipe end and the plurality of cutting teeth dig into the material of the first pipe end during a pressing-together.

5. The pressed-connection arrangement according to claim 2, wherein the sealing ring is held on a side facing the first pipe end in the receiving device.

6. The pressed-connection arrangement according to claim 1, wherein the rounded edges are located on an exterior side of the separating ring facing away from the first pipe end, the rounded edges projecting toward the sealing ring.

7. The pressed-connection arrangement according to claim 1, wherein the separating ring is constructed to be closed in a surrounding manner and is made of an elastic material.

8. The pressed-connection arrangement according to claim 1, wherein the separating ring is produced from a plastic material.

9. The pressed-connection arrangement according to claim 1, wherein the receiving device includes a set-back.

\* \* \* \* \*